United States Patent
Wang

(10) Patent No.: US 11,738,769 B2
(45) Date of Patent: Aug. 29, 2023

(54) VEHICLE-LAUNCHING WARNING DEVICE, SYSTEM AND METHOD

(71) Applicant: Volvo Car Corporation, Gothenburg (SE)

(72) Inventor: Wei Wang, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 62 days.

(21) Appl. No.: 17/477,665

(22) Filed: Sep. 17, 2021

(65) Prior Publication Data
US 2022/0097723 A1   Mar. 31, 2022

(30) Foreign Application Priority Data
Sep. 28, 2020 (CN) .......................... 202011041761.3

(51) Int. Cl.
*B60W 50/14* (2020.01)
*G06N 20/00* (2019.01)
(Continued)

(52) U.S. Cl.
CPC ............ *B60W 50/14* (2013.01); *B60W 40/04* (2013.01); *B60W 40/08* (2013.01); *G06N 20/00* (2019.01);
(Continued)

(58) Field of Classification Search
CPC ... B60W 2040/0818; B60W 2540/225; B60W 2540/229; B60W 40/04; G06V 20/584
See application file for complete search history.

(56) References Cited

U.S. PATENT DOCUMENTS

2011/0260886 A1* 10/2011 Nagura .................. G08G 1/081
                                                                340/905
2015/0232026 A1    8/2015 Lueke et al.
(Continued)

FOREIGN PATENT DOCUMENTS

CN            110077398 A      8/2019

OTHER PUBLICATIONS

Feb. 16, 2022 European Search Report issued on International Application No. 21199192.2.
(Continued)

*Primary Examiner* — Thomas S McCormack
(74) *Attorney, Agent, or Firm* — Clements Bernard Walker; Christopher L. Bernard

(57) ABSTRACT

A vehicle-launching warning device including an acquiring module acquiring traffic light information and driver status information and some or all of: location information, status and navigation of a vehicle, map information, status information of a preceding vehicle, and environmental information; a processing module processing the acquired information to determine whether a target traffic light is at the end of a red light signal and whether a driver's degree of attentiveness is high enough for driving, the target traffic light being a next traffic light in a travelling direction of the vehicle after passing through a current traffic light; a determining module generating a warning command if it is determined the target traffic light is at the end of a red light signal and the driver's degree of attentiveness is not high enough for driving; and an outputting module outputting the warning command to a human machine interface (HMI).

15 Claims, 4 Drawing Sheets

(51) Int. Cl.
  G06V 20/58    (2022.01)
  B60W 40/04    (2006.01)
  B60W 40/08    (2012.01)
  B60W 50/00    (2006.01)

(52) U.S. Cl.
  CPC ... G06V 20/584 (2022.01); B60W 2040/0818 (2013.01); B60W 2050/0054 (2013.01); B60W 2050/143 (2013.01); B60W 2050/146 (2013.01); B60W 2540/225 (2020.02); B60W 2540/229 (2020.02)

(56)     References Cited

U.S. PATENT DOCUMENTS

| | | | |
|---|---|---|---|
| 2017/0124868 | A1 | 5/2017 | Bhat et al. |
| 2017/0217421 | A1* | 8/2017 | Theodosis ............. G08G 1/096 |
| 2018/0194282 | A1 | 7/2018 | Wolterman |
| 2020/0339143 | A1* | 10/2020 | Kozlowski ............. G06V 20/58 |
| 2022/0051038 | A1* | 2/2022 | Coimbra De Andrade ................ G06N 20/00 |

OTHER PUBLICATIONS

Mar. 23, 2023 Office Action issued in corresponding CN Application No. 202011041761.3.

* cited by examiner

VEHICLE-LAUNCHING WARNING DEVICE, SYSTEM AND METHOD

CROSS-REFERENCE TO RELATED APPLICATION

The present disclosure claims the benefit of priority of co-pending Chinese Patent Application No. CN 202011041761.3, filed on Sep. 28, 2020, and entitled "VEHICLE-LAUNCHING WARNING DEVICE, SYSTEM AND METHOD," the contents of which are incorporated in full by reference herein.

TECHNICAL FIELD

The present disclosure relates to the technical field of vehicle driving assistance, in particular to a vehicle-launching warning device, a vehicle-launching warning system and a vehicle-launching warning method, and also relates to a corresponding non-transitory computer readable medium.

BACKGROUND

With the rapid development of the automobile industry, driving assistance functions are increasingly used in vehicles in order to improve the safety and comfort of the vehicles. Among the functions available, the warning function associated with vehicle launching is quite useful, which can help a driver launch the vehicle in time in the case of a traffic jam or waiting for the change of a traffic light signal state, so as to avoid missing the current green phase of a traffic light signal or lead to a traffic jam.

According to a conventional warning function, a vehicle is usually configured to automatically trigger a warning to a driver once it detects the vehicle in front launches to move. However, such a conventional solution includes several challenges. For example, a driver receives a vehicle-launching warning when he or she is launching a vehicle, which causes excessive disturbance to the driver. In addition, in a condition that the vehicle does not need to launch immediately after the vehicle in front launches to move, sending warning to the driver also causes excessive disturbance to the driver.

SUMMARY

In view of the above problems in the prior art, the present disclosure provides in one aspect a vehicle-launching warning device including: an acquiring module configured to acquire traffic light information and driver status information and to acquire some or all of the following: information on location, status and navigation of a vehicle, map information, status information of a preceding vehicle, and environmental information; a processing module configured to process the acquired information to determine whether a target traffic light is at the end of a red light signal and to determine whether the driver's degree of attentiveness is high enough for driving, the target traffic light being a next traffic light in a travelling direction of the vehicle after passing through a current traffic light; a determining module configured to generate a warning command if it is determined the target traffic light is at the end of a red light signal and the driver's degree of attentiveness is not high enough for driving; and an outputting module configured to output the warning command to a human machine interface (HMI) of the vehicle to trigger a vehicle-launching warning in the vehicle.

The present disclosure provides in another aspect a vehicle-launching warning system including: a vehicle-launching warning device as described above, the vehicle-launching warning device being configured to output a warning command if a target traffic light is at the end of a red light signal and the driver's degree of attentiveness is not high enough for driving; and a HMI in communication with the vehicle-launching warning device, the HMI being configured to provide a vehicle-launching warning for warning vehicle launching in a vehicle based on the warning command.

The present disclosure provides in yet another aspect a vehicle-launching warning method optionally executed by means of a vehicle-launching warning device as described above and/or a vehicle-launching warning system as described above, the method including the steps of: acquiring traffic light information and driver status information and acquiring some or all of the following: information on location, status and navigation of a vehicle, map information, status information of a preceding vehicle, and environmental information; processing the acquired information to determine whether a target traffic light is at the end of a red light signal and to determine whether the driver's degree of attentiveness is high enough for driving, the target traffic light being a next traffic light in a travelling direction of the vehicle after passing through a current traffic light; generating a warning command if it is determined the target traffic light is at the end of a red light signal and the driver's degree of attentiveness is not high enough for driving; and outputting the warning command to a HMI of the vehicle to trigger a vehicle-launching warning in the vehicle.

The disclosure provides in yet another aspect a non-transitory machine or computer readable medium in which software in the form of instructions stored in a memory is stored, the software being optionally able to be executed by a vehicle-launching warning device described above, and the software, when executed, being able to perform a vehicle-launching warning method described above.

BRIEF DESCRIPTION OF THE DRAWINGS

The disclosed aspects will hereinafter be described in connection with the appended drawings that are provided to illustrate and not to limit the scope of the disclosure.

DETAILED DESCRIPTION

A driver does not always concentrate on a traffic light while waiting for a target traffic light to turn green, especially at an intersection with a long red-light duration, and he or she may fail to launch a vehicle (i.e., a host vehicle) in time after the traffic light turns from red to green, resulting in road congestion and reduced traffic efficiency. Moreover, this may cause a series of problems such as road rage, whistling, congestion and increased exhaust emissions. In view of the above problems, the present disclosure provides a vehicle-launching warning solution for warning vehicle launching which determines whether to send a vehicle-launching warning to a driver based on states of a target traffic light and driver's degree of attentiveness.

The present disclosure also provides a control logic that can determine situations in which it is unnecessary to trigger a vehicle-launching warning (e.g., the situation in which a vehicle is impossible to pass through the target traffic light during the next green-light signal) so as to avoid excessive interruption to the driver and also avoid misleading to the driver (e.g., the warning is triggered un-appropriately and the driver launches the vehicle without thinking upon receiving a vehicle-launching warning).

The present disclosure also provides a control logic that can determine a timing at which the vehicle-launching warning is sent out and a triggering mode (e.g., a triggering degree and frequency of the vehicle-launching warning) with which the vehicle-launching warning is provided based on driver's state (e.g., driver's degree of attentiveness) so as to improve the accuracy of the triggering time and triggering frequency and also improve the flexibility of triggering the vehicle-launching warning. In this way, the user-friendliness of the vehicle is improved. Some possible embodiments of the present disclosure will be described now.

Figure 1:
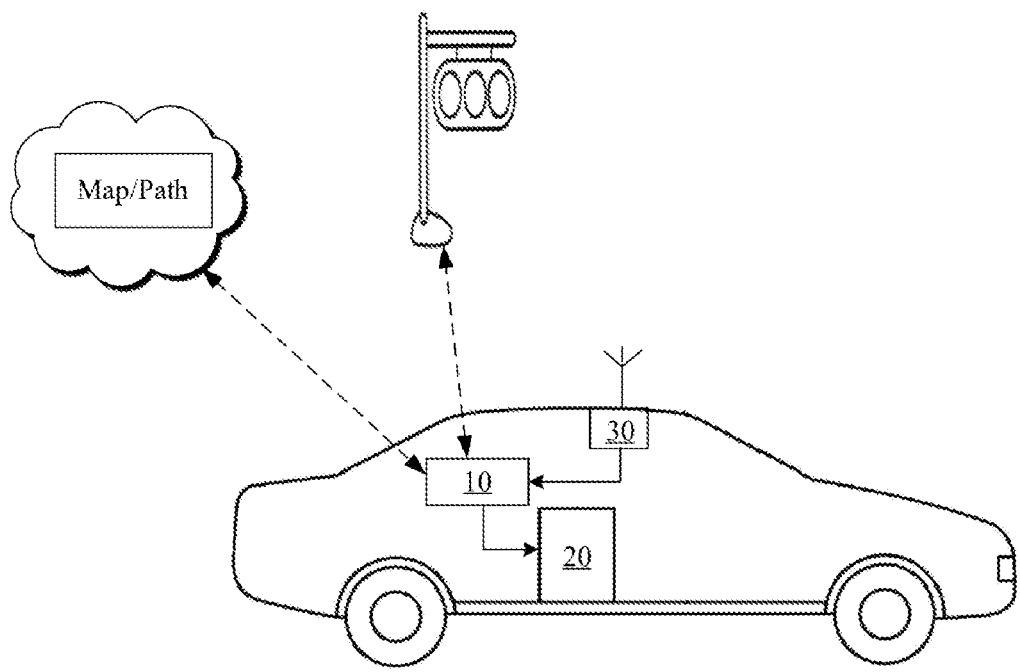
FIG. 1 is an exemplary environment in which some embodiments of the present disclosure may be implemented.
Figure 2:
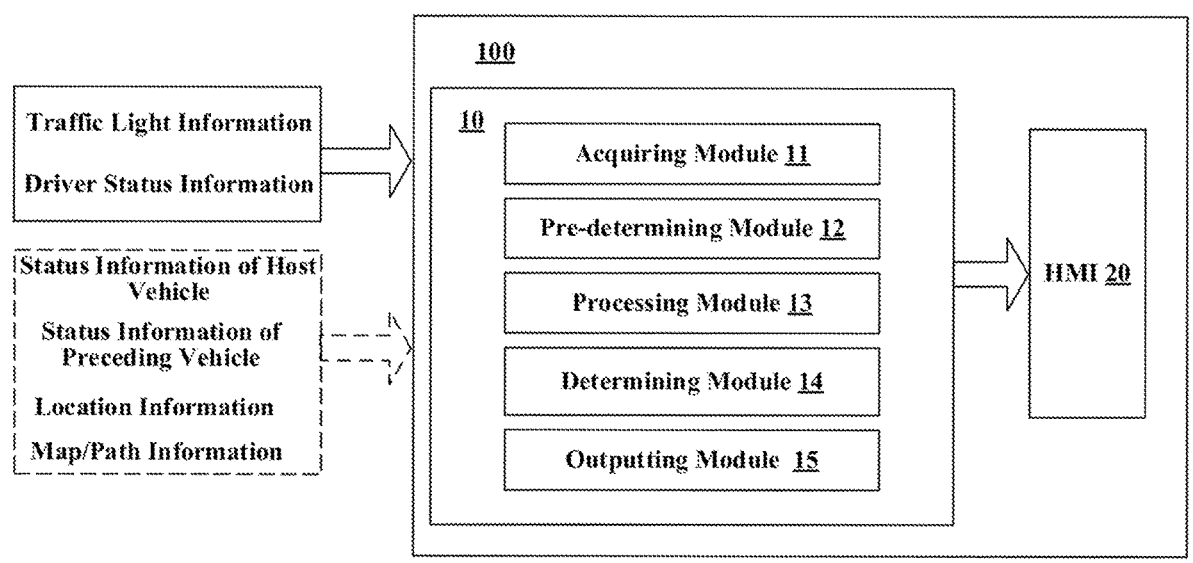
FIG. 2 is a schematic block diagram of a vehicle-launching warning system according to an embodiment of the present disclosure.

FIG. 1 shows an exemplary environment in which some embodiments of the present disclosure may be implemented. FIG. 2 schematically shows a vehicle-launching warning system 100 for warning vehicle launching according to an embodiment of the present disclosure. The vehicle-launching warning system 100 for warning vehicle launching is disposed on or in a vehicle. The warning system for warning vehicle launching mainly includes a vehicle-launching warning device 10 and a HMI 20.

The vehicle-launching warning device 10 may obtain traffic light information and driver status information, analyze the obtained information, and determine whether to trigger a vehicle-launching warning in the vehicle according to a remaining time of a current red signal and driver's degree of attentiveness. If it is determined a vehicle-launching warning needs to be triggered, a warning command is generated and output.

The traffic light information may include a plurality of types of information, such as a current light color and a remaining time of the current light phase, optionally, the traffic light information further includes time periods of other light phases.

The vehicle-launching warning device 10 may obtain the traffic light information from an intelligent traffic light. For example, the intelligent traffic light transmits information including its own status to a vehicle via a wireless communication (e.g., 5G, C-V2X or DSRC) in real time. In other words, the vehicle obtains traffic light information by means of interconnections between the vehicle and the intelligent traffic light serving as a roadside device. The traffic light information may be captured by in-vehicle sensors (e.g., a camera, radar and lidar). The vehicle-launching warning device 10 processes and analyzes the captured information to obtain the status of the traffic light.

The driver status information may include a plurality of types of information. For example, the driver status information includes one or more of the following: a gaze direction, a head direction, a blinking frequency, a size and an orientation of a pupil and facial expressions of the driver.

The vehicle-launching warning device 10 may acquire an image including the driver's status information from an in-vehicle camera, analyze and process the acquired image to obtain the driver's status. The warning device 10 may also obtain the driver's status information from a vehicle driver monitoring system (DMS).

Additionally, the vehicle-launching warning device 10 may also obtain state parameters of the vehicle through an in-vehicle bus system, obtain surrounding environment conditions, vehicle parameters of surrounding vehicles, map data and navigation path from a cloud sever or a roadside device through a wireless communication interface of the vehicle, and use some or all of the information to assist analysis and judgment.

For example, the vehicle-launching warning device 10 may obtain status information of the vehicle (e.g., a vehicle speed), status information of preceding vehicles (e.g., vehicle types of preceding vehicles, a size of each vehicle type, a launching time of each of the preceding vehicles and a number of each vehicle type), map information (e.g., map data for lane-level digital maps), and navigation information (e.g., a navigation path of the vehicle), and use some or all of the information to calculate parameters to be used in subsequent analyses and proceedings. For example, the parameters may include a travelling lane of the vehicle, a target travelling direction of the vehicle and a target traffic light (the target traffic light is a next traffic light in a travelling direction of the vehicle after passing through a current traffic light), a queuing distance between the vehicle and a stop line and a total launching time of all of the preceding vehicles (i.e., a delay time for the vehicle to launch).

In a further embodiment, if the warning device 10 determines the vehicle-launching warning does not need to be triggered according to the acquired information or information calculated based on the acquired information, the warning device 10 ends this process.

In a further embodiment, the vehicle-launching warning device 10 may determine a triggering timing and/or a triggering mode of the warning according to the acquired information or the information calculated based on the acquired information, and driver's degree of attentiveness. Then, the vehicle-launching warning device 10 may generate a warning command and output the warning command to a HMI of the vehicle.

The HMI 20 is configured to provide the vehicle-launching warning in the vehicle upon receiving the warning command according to a triggering timing and/or a triggering mode included in the warning command. The vehicle-launching warning may include one or more forms of visual, audio, voice, and vibration. The HMI 20 may be implemented in a steering wheel, a driver's seat, a head-up display, a central control display screen or a voice broadcaster which is integrated with corresponding warning functions.

Additionally, the vehicle-launching warning system 100 for warning vehicle launching may also include a positioning device 30 for determining a position of the vehicle. The positioning device 30 may be implemented as a vehicle GPS, which determines a position the vehicle based on received satellite signals. The positioning device 30 may also be a device that realizes positioning based on other technologies, for example, a locator based on computer vision technology, radio frequency identification positioning technology, ultra-wideband positioning technology, or base station positioning technology. Embodiments of the vehicle-launching warning device 10 are described below.

In an embodiment, the vehicle-launching warning device 10 includes an acquiring module 11, a pre-determining module 12, a processing module 13, a determining module 14 and an outputting module 15. The vehicle-launching warning device 10 and its modules may be implemented by means of hardware or software or a combination of hardware and software, including a non-transitory computer readable medium stored in a memory and implemented as instructions executed by a processor. Regarding the part implemented by means of hardware, it may be implemented in application-specific integrated circuit (ASIC), digital signal processor (DSP), data signal processing device (DSPD), programmable logic device (PLD), field programmable gate array (FPGA), processor, controller, microcontroller, microprocessor, electronic unit, or a combination thereof. The part implemented by software may include microcode, program code or code segments. The software may be stored in a machine readable storage medium, such as a memory.

It is noted that the vehicle-launching warning device 10 and its modules are named functionally (logically) and their physical positions are not limited by the functional names. In other words, the modules may be included in the same chip or circuit. The modules may also be provided in different chips or circuits.

In an embodiment, the vehicle-launching warning device 10 may be implemented to include a memory and a processor. The memory contains instructions that, when executed by the processor, cause the processor to execute the vehicle-launching warning strategy/method according to embodiments of the disclosure.

In an embodiment, the vehicle-launching warning device 10 is implemented by software disposed in a domain controller or an electronic control unit (ECU) of the vehicle.

Figure 3:
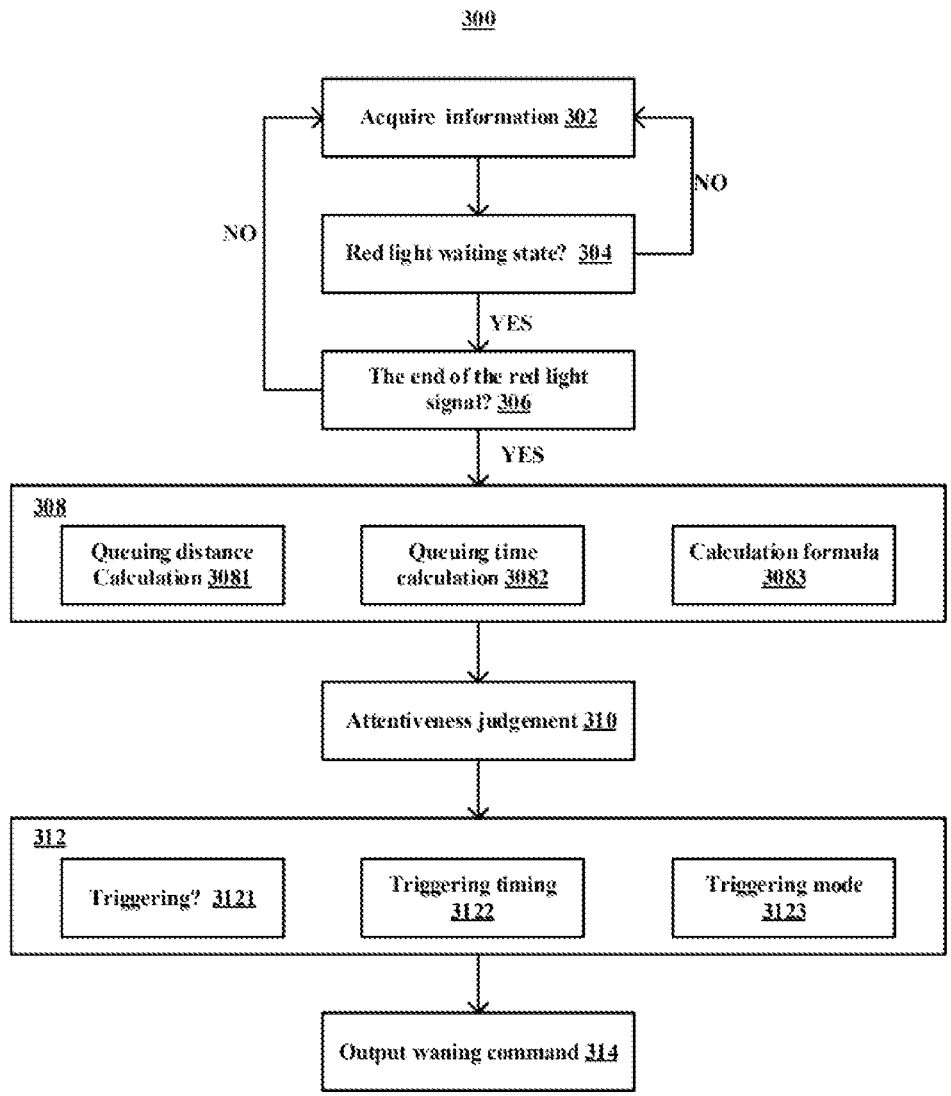
FIG. 3 schematically shows a vehicle-launching warning process according to an embodiment of the present disclosure.

FIG. 3 illustrates a vehicle-launching warning process according to a feasible embodiment of the disclosure. The process may be executed in the vehicle-launching warning device 10. Hereinafter, the working principle of the vehicle-launching warning device 10 is introduced in combination with FIG. 3.

In block 302, the acquiring module 11 acquires traffic light information, driver status information and some or all of the following: information on location, status and navigation of the vehicle, and map information and navigation information of a preceding vehicle, and environmental information. The order and timing of acquiring the information are not limited in the disclosure. The information may be acquired in real time, acquired at a predetermined frequency, or acquired before calculation and processing.

In block 304, the pre-determining module 12 determines whether the vehicle is in a red light waiting state based on the acquired information or information calculated according to the acquired information. If it is determined that the vehicle is in the red light waiting state, the subsequent processing operations of the device 10 are activated, that is, a warning function for warning the launching of the vehicle is activated. If it is determined that the vehicle is not in the red light waiting state, the subsequent processing operations of the device 10 are not activated, that is, the warning function of the vehicle is not activated.

In an example, the pre-determining module 12 may determine a lane of the vehicle (i.e., a lane where the vehicle is located) based on (1) a position of the vehicle and map data; or (2) a navigation path (e.g., a navigation path is included in the navigation information). The pre-determining module 12 may determine a target travelling direction of the vehicle based on (1) the navigation path; or (2) the position of the vehicle, the map data and visual recognition and judgment functions of an in-vehicle camera, and determine the target traffic light (for example, if the vehicle is about to turn left, the left turn traffic light is determined as the target traffic light). Then, if the following conditions are met, the pre-determining module 12 determines that the vehicle is in the red light waiting state: (1) the target traffic light is in a red light phase; (2) the vehicle has a current speed of zero with a duration over a predetermined time period (for example, the vehicle has a current speed of zero with a duration over 5 seconds).

In the case that it is determined in the red light waiting state, the procedure proceeds to block 306. In block 306, the processing module 13 determines whether the target traffic light is at the end of a red light signal. "The end of a red light signal" can be understood as a remaining time of the red light signal being less than a predetermined time threshold. For example, the target traffic light signal is in a red light phase and will change to green in 10 seconds (e.g., the predetermined time threshold is 10 seconds). In an embodiment, the acquiring module 11 acquires the traffic light information from an intelligent traffic light and the processing module 13 determines a remaining time of a current light phase based on the acquired information. In another embodiment, the acquiring module 11 acquires a series of pictures from an in-vehicle camera and the processing module 13 recognizes and analyzes the acquired pictures to obtain a remaining time of a current light phase. In yet another embodiment, the acquiring module 11 acquires traffic light information from a cloud server and the processing module 13 determines a remaining time of a current light phase based on the acquired information.

It is noted that the vehicle may obtain a remaining time of a current light phase regardless of whether display information of a current traffic light includes the remaining time, because the vehicle can obtain information including the remaining time through the interconnection between the vehicle and a cloud sever and/or a roadside device.

In block 308, after determining the target traffic light is at the end of the red light signal, the processing module 13 performs calculation and judgment to determine whether it is necessary to trigger the vehicle-launching warning so as to exclude situations without the need to trigger the vehicle-launching warning, thereby avoiding excessive interruption to the driver.

In block 3081, the processing module 13 calculates a queuing distance L_queue (i.e., a distance of the vehicle from a stop line) of the vehicle in the case that the vehicle is not a lead vehicle. The processing module 13 may calculate a distance between the current position of the vehicle and the stop line to obtain the queuing distance L_queue. If the queuing distance L_queue is less than a distance threshold, the processing module 13 will continue to perform subsequent processing operations of the device 10. If the queuing distance L_queue is greater than or equal to the distance threshold, the processing module 13 will end subsequent processing operations of the device 10. The distance threshold may be determined based on the following parameter, i.e., a distance obtained by multiplying a launching speed of the vehicle by a sum of a remaining time of a current red light phase and a time period of a subsequent green light phase. Of course, the distance threshold may include some margins based on the above parameter according to actual situations. It is seen that the judgment of the queuing distance provides advantages. The vehicle-launching warning may not be sent to the driver in the case where the vehicle is estimated to be far away from the stop line so that the vehicle cannot pass through the stop line during the subsequent green light phase. In this way, the driver of the vehicle does not need to pay attention to the launching time urgently without affecting the passage of the rear and surrounding vehicles.

In block 3082, the processing module 13 calculates a queuing time T_queue (i.e., a delayed launching time of the vehicle) that the vehicle needs to wait due to the launching of proceeding vehicles. The queuing time T_queue can be obtained by calculating a total launching time of the proceeding vehicles. If the queuing time T_queue is less than a time threshold, the processing module 13 will continue to perform subsequent processing operations of the device 10. If the queuing time T_queue is greater than or equal to the time threshold, the processing module 13 will end subsequent processing operations of the device 10. The time threshold may be predetermined based on a sum of a remaining time of a current red light phase and a time period of a subsequent green light phase. It is seen that the judgment of the queuing time provides advantages. The vehicle-launching warning may not be sent to the driver in the case where the delayed launching time of the vehicle is so long that the vehicle cannot pass through the stop line during the subsequent green light phase. In this way, the driver of the vehicle does not need to pay attention to the launching time urgently without affecting the passage of the rear and surrounding vehicles.

Example of calculating the queuing time T_queue of the vehicle will be described. In an example, the acquiring module 11 obtains vehicle parameters of proceeding vehicles from a cloud server. The vehicle parameters of proceeding vehicles may include vehicle types, a number of each of the vehicle types, and a delayed launching time of each of the proceeding vehicles. The processing module 13 may calculate a delayed launching time of each of the proceeding vehicles and then sums these delayed launching times to obtain a total delayed launching time (i.e., a delayed launching time of the vehicle). For example, among the proceeding vehicles, there are five cars each of which has a type A and a launching time t(A); two trucks each of which has a type B and a launching time t(B) and one bus having a type C and a launching time t(C). In this case, the total delayed launching time of the proceeding vehicles (i.e., a delayed launching time of the vehicle) will be calculated by the formula:

$$T\_queue=t(A)*5+t(B)*2+t(C)*1.$$

In another example, an average length L_car of the proceeding vehicles may be estimated at a cloud server. The average length L_car may be obtained by calculating a sum of an average vehicle length and an average spacing distance of the proceeding vehicles, Next, the queuing distance L_queue is divided by the average length L_car to obtain a number N of the proceeding vehicles. Next, an average launching time T_car is multiplied by the number N to obtain the queuing time T_queue.

In block 3083, the processing module 13 calculates the queuing time T_queue of the vehicle according to the following formula and determines whether to trigger the vehicle-launching warning:

$$T\_queue=\Sigma A(i)*t(i)*L/\Sigma A(i)*l(i)+L/S,$$

where "i" is representative of a vehicle type of a preceding vehicle), "A(i)" is a ratio of the number of i-type vehicles to a total number of preceding vehicles, "t(i)" is a launching time of the i-type vehicle, "l(i)" is a length of the i-type vehicle, "L" is a distance of the vehicle from the stop line, and "S" is a speed limit of a current lane.

If the queuing time T_queue is less than a time threshold, the processing module 13 will continue to perform subsequent processing operations of the device 10. If the queuing time T_queue is greater than or equal to the time threshold, the processing module 13 will end subsequent processing operations of the device 10.

The time threshold may be determined based on a sum of a remaining time of a current red light phase and a time period of a subsequent green light phase.

It will be noted that one or more of the blocks 3081, 3082, and 3083 may be selectively executed. If two or more blocks are executed, the execution order is not limited in the disclosure.

In block 310, the processing module 13 determines driver's degree of attentiveness and determines whether the driver's degree of attentiveness is high enough for driving.

In an embodiment, the processing module 13 calculates an attention level that characterizes a level of the driver's degree of attentiveness. If the calculated attention level is greater than a level threshold, it is determined the driver's degree of attentiveness is high enough for driving. If the calculated attention level is smaller than or equal to a level threshold, it is determined the driver's degree of attentiveness is not high enough for driving. For example, the processing module 13 may use parameters (e.g., gaze direction, head direction, blinking frequency, size and orientation of pupils and facial expressions of the driver) included in the driver status information as a model input of a machine learning model and the attention level will be output from the model.

In another example, the processing module 13 determines whether the driver's degree of attentiveness is high enough for driving by the steps of: determining the driver's degree of attentiveness is not high enough for driving if a remaining time of a current red light phase is zero and a time period during which the driver is not concentrating exceeds an inattentive period threshold (for example, the inattentive period threshold is six seconds), and determining that the driver's degree of attentiveness is high enough for driving if the remaining time of the current red light phase is zero and the time period during which the driver is not concentrating does not exceed the inattentive period threshold. In this way, there is no need to send the vehicle-launching warning to the driver if the driver's attention is only momentarily or slightly distracted, so as not to cause excessive disturbance.

In block 312, the determining module 14 determines whether to trigger the vehicle-launching warning, when to trigger the vehicle-launching warning, and how to trigger the vehicle-launching warning, and generates a warning command if it is determined to rigger the vehicle-launching warning. The warning command includes a triggering timing and/or a triggering mode of the vehicle-launching warning.

In block 3121, if the conditions of (1) the target traffic light being at the end of a red light signal; and (2) the driver's degree of attentiveness being not high enough for driving are met, the determining module 14 determines to trigger the vehicle-launching warning and generates a warning command.

In block 3122, the determining module 14 determines a triggering timing of the vehicle-launching warning based on the driver's degree of attentiveness, so that the vehicle-launching warning is trigger earlier as the driver's degree of attentiveness lowers. For example, if the driver is seriously inattentive, the vehicle-launching warning is triggered 20 seconds before the launching of the vehicle; if the driver's attention is moderately inattentive, the vehicle-launching warning is triggered 10 seconds before the launching of the vehicle. In an example, the driver's degree of attentiveness can be divided into several levels, so as to determine an appropriate triggering timing before the launching of the vehicle.

It is noted that, regarding calculation of a launching time of the vehicle, situations of the vehicle being a lead vehicle and the vehicle being not a lead vehicle are considered. In the case of the vehicle being not a lead vehicle, a queuing time of the vehicle due to launching of a preceding vehicle is considered.

In block 3123, the determining module 14 determines a triggering mode with which the vehicle-launching warning is triggered according to the driver's degree of attentiveness, so that a triggering degree of the vehicle-launching warning is enhanced and/or a triggering frequency of the vehicle-launching warning is increased as the driver's degree of attentiveness lowers. For example, if the driver is seriously inattentive, the HMI may provide visual, voice and vibration warning to the driver, and may use strong voice, strong vibration, and repeated warnings. If the driver's attention is moderately distracted, the HMI may provide visual and voice warning, and may use medium volume and medium vibration intensity. In an embodiment, the driver's degree of attentiveness can be divided into several levels, so as to determine an appropriate triggering mode.

In block 314, the outputting module 15 outputs a warning command to the HMI 20, so that the HMI 20 provides the vehicle-launching warning in the vehicle according to the warning command.

Figure 4:
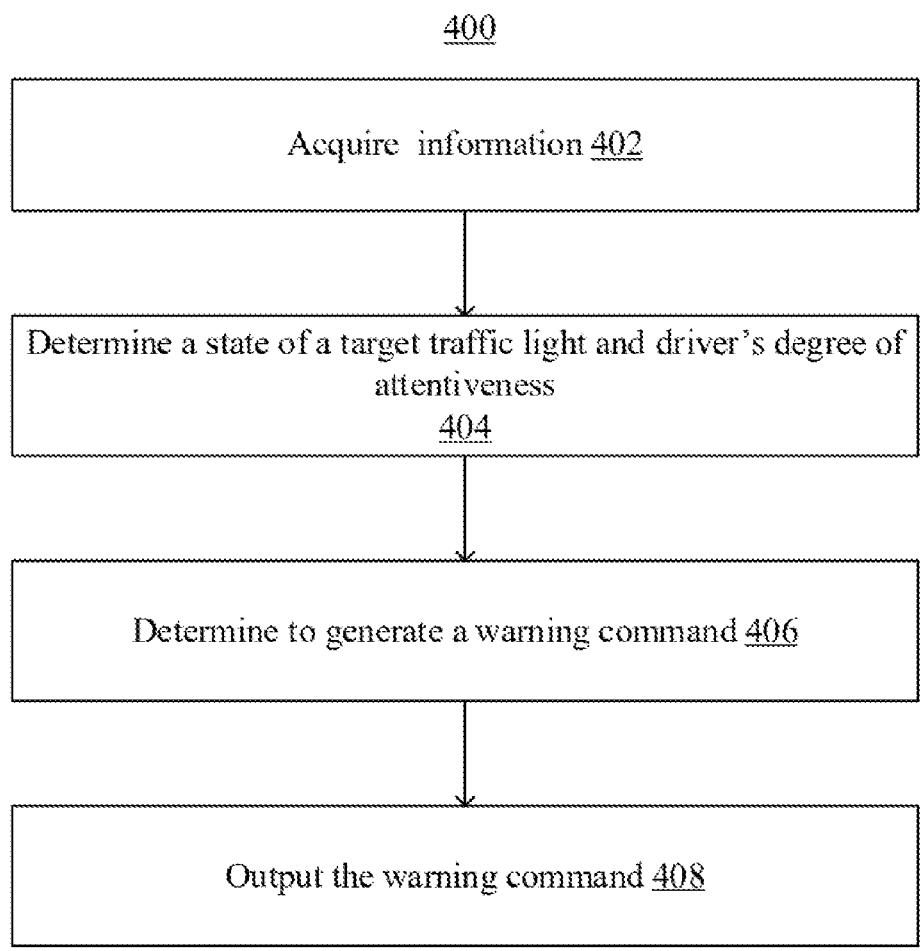
FIG. 4 is a flowchart of a vehicle-launching warning method according to an embodiment of the present disclosure.

FIG. 4 shows a vehicle-launching warning method 400 according to a feasible embodiment of the disclosure. The method can be performed by means of a vehicle-launching warning device 10 as described above and/or a vehicle-launching warning system 100 as described above. For this reason, various features, which are described above with reference to the device and the system, are also applicable in the method.

Referring to FIG. 4, in step 402, traffic light information and driver status information are acquired, and some or all of the following are acquired: information on location, status and navigation of a vehicle, map information, status information of a preceding vehicle, and environmental information.

In step 404, the acquired information is processed to determine whether a target traffic light is at the end of a red light signal and to determine whether the driver's degree of attentiveness is high enough for driving. The target traffic light is a next traffic light in a travelling direction of the vehicle after passing through a current traffic light.

In step 406, a warning command is generated if it is determined the target traffic light is at the end of a red light signal and the driver's degree of attentiveness is not high enough for driving.

In step 408, the warning command is output to a human machine interface (HMI) of the vehicle to trigger a vehicle-launching warning in the vehicle.

An embodiment of the disclosure may provide a machine or computer readable medium in which software is stored, the software being optionally able to be executed by a vehicle-launching warning device as described above, and the software, when executed, being able to perform a vehicle-launching warning method as described above.

It should be appreciated that all the operations in the method described above are merely exemplary, and the disclosure is not limited to any operations in the method or sequence orders of these operations, and should cover all other equivalents under the same or similar concepts.

The processors can be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a micro-controller, a digital signal processor (DSP), a field programmable gate array (FPGA), a programmable logic device (PLD), state machine, gate logic, discrete hardware circuitry, and other suitable processing components configured to perform the various functions described in this disclosure. The functions of a processor, any portion of a processor, or any combination of processors presented in this disclosure may be implemented as software executed by a microprocessor, a micro-controller, a DSP, or other suitable platforms.

Software should be considered broadly to represent instructions, instruction sets, code, code segments, program code, programs, subroutines, software modules, applications, software applications, software packages, routines, subroutines, objects, running threads, processes, functions, and the like. Software can reside on a non-transitory computer readable medium. Such non-transitory computer readable medium may include, for example, a memory, which may be, for example, a magnetic storage device (e.g., a hard disk, a floppy disk, a magnetic strip), an optical disk, a smart card, a flash memory device, a random access memory (RAM), a read only memory (ROM), a programmable ROM (PROM), an erasable PROM (EPROM), an electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalent transformations to the elements of the various aspects of the disclosure, which are known or to be apparent to those skilled in the art, are intended to be covered by the claims.

The invention claimed is:

1. A vehicle-launching warning device, comprising:
an acquiring module configured to acquire traffic light information and driver status information and to acquire some or all of the following: information on location, status and navigation of a vehicle, map information, status information of a preceding vehicle, and environmental information;
a processing module configured to process the acquired information to determine that a target traffic light is in a red light signal and whether the target traffic light is within a threshold of an end of the red light signal and to determine whether the driver's degree of attentiveness is high enough for driving, the target traffic light being a next traffic light in a travelling direction of the vehicle after passing through a current traffic light;
a determining module configured to generate a warning command if it is determined the target traffic light is in the red light signal and within the threshold of the end of a red light signal and the driver's degree of attentiveness is not high enough for driving; and an outputting module configured to output the warning command to a human machine interface (HMI) of the vehicle to trigger a vehicle-launching warning in the vehicle.

2. The vehicle-launching warning device of claim 1, wherein the determining module is further configured to determine a triggering timing at which the vehicle-launching warning is triggered based on the driver's degree of attentiveness such that the vehicle-launching warning is triggered earlier by the HMI as the driver's degree of attentiveness lowers.

3. The vehicle-launching warning device of claim 1, wherein the determining module is further configured to determine a triggering mode with which the vehicle-launching warning is triggered based on the driver's degree of attentiveness such that a triggering degree of the vehicle-launching warning is enhanced and/or a triggering frequency of the vehicle-launching warning is increased as the driver's degree of attentiveness lowers.

4. The vehicle-launching warning device of claim 1, wherein the warning device further comprises a pre-determining module, the pre-determining module is configured to determine whether the vehicle is in a red light waiting state based on the acquired information, to activate the subsequent determining and processing operations of the vehicle-launching warning device if the vehicle is determined to be in the red light waiting state, and not to activate a subsequent processing of the vehicle-launching warning device if the vehicle is determined not to be in the red light waiting state; and the pre-determining module is configured to determine the vehicle is in the red light waiting state if the following conditions are met: (1) the target traffic light signal is in a red light phase; and (2) the vehicle has a current speed of zero with a duration over a predetermined time period.

5. The vehicle-launching warning device of claim 1, wherein the processing module is further configured to calculate a distance of the vehicle from a stop line before determining whether the driver's degree of attentiveness is high enough for driving in case of the vehicle being not a lead vehicle, to continue to determine the driver's degree of attentiveness if the distance is less than a distance threshold; and to end subsequent processing operations of the vehicle-launching warning device if the distance is greater than or equal to the distance threshold.

6. The vehicle-launching warning device of claim 1, wherein the processing module is further configured to calculate a waiting time of the vehicle due to launching of the preceding vehicle before determining whether the driver's degree of attentiveness is high enough for driving, to continue to determine the driver's degree of attentiveness if the waiting time is less than a time threshold, and to end the subsequent processing operations of the vehicle-launching warning device if the waiting time is greater than or equal to the time threshold, and the time threshold is determined based on a sum of a remaining time of the current red light phase and a time period of a subsequent green light phase.

7. The vehicle-launching warning device of claim 1, wherein the processing module is configured to calculate a queuing time T_queue of the vehicle due to launching of the preceding vehicle before determining whether the driver's degree of attentiveness is high enough for driving based on the following formula:

$$T\_queue = \Sigma A(i)*t(i)*L/\Sigma A(i)*l(i)+L/S$$

where "i" is representative of a vehicle type of the preceding vehicle, "A(i)" is a ratio of the number of i-type vehicles to a total number of preceding vehicles, "t(i)" is a launching time of the i-type vehicle, "l(i)" is a length of the i-type vehicle, "L" is a distance of the vehicle from a stop line, and "S" is a speed limit of a current lane, wherein the processing module is configured to continue to determine the driver's degree of attentiveness if the queuing time T_queue is less than a time threshold, and to end the subsequent processing operations of the vehicle-launching warning device if the queuing time is greater than or equal to the time threshold, and wherein the time threshold is determined based on a sum of a remaining time of the current red light phase and a time period of a subsequent green light phase.

8. The vehicle-launching warning device of claim 1, wherein the processing module is configured to calculate an attention level of the driver's degree of attentiveness based on the driver status information, and to determine whether the driver's degree of attentiveness is high enough for driving based on the attention level, and wherein the processing module is configured to input the driver status information to a machine learning model stored in the processing module and the attention level is output from the machine learning model.

9. The vehicle-launching warning device of claim 1, wherein the processing module is configured to determine the driver's degree of attentiveness is not high enough for driving if a remaining time of the current red light phase is zero and a duration during which the driver is not concentrating exceeds an inattentive period threshold.

10. The vehicle-launching warning device of claim 4, wherein the pre-determining module is further configured to determine a target travelling direction of the vehicle after passing through the current traffic light based on (1) navigation information and/or (2) location information, map information and environmental information, and to determine the target traffic light based on the target travelling direction and the traffic light information.

11. The vehicle-launching warning device of claim 1, wherein the traffic light information includes a current light color and a remaining time of the current light phase and the traffic light information further includes time periods of other light phases.

12. The vehicle-launching warning device of claim 1, wherein the driver status information includes one or more of the following: a gaze direction, a head direction, a blinking frequency, a size and an orientation of a pupil and facial expressions of the driver.

13. A vehicle, comprising:

a vehicle-launching warning device, comprising:

an acquiring module configured to acquire traffic light information and driver status information and to acquire some or all of the following: information on location, status and navigation of a vehicle, map information, status information of a preceding vehicle, and environmental information;

a processing module configured to process the acquired information to determine that a target traffic light is in a red light signal and whether the target traffic light is within a threshold of an end of the red light signal and to determine whether the driver's degree of attentiveness is high enough for driving, the target traffic light being a next traffic light in a travelling direction of the vehicle after passing through a current traffic light;

a determining module configured to generate a warning command if it is determined the target traffic light is in the red light signal and within the threshold of the end of a red light signal and the driver's degree of attentiveness is not high enough for driving;

a human machine interface (HMI) in communication with the vehicle-launching warning device; and an outputting module configured to output the warning command to the HMI of the vehicle to trigger a vehicle-launching warning in the vehicle;

wherein the vehicle-launching warning device is configured to output a warning command if a target traffic light is at the end of a red light signal and the driver's degree of attentiveness is not high enough for driving; and wherein the HMI is configured to provide a vehicle-launching warning for warning vehicle launching in a vehicle based on the warning command.

14. A vehicle-launching warning method, comprising:

acquiring traffic light information and driver status information and acquiring some or all of the following: information on location, status and navigation of a vehicle, map information, status information of a preceding vehicle, and environmental information;

processing the acquired information to determine that a target traffic light is in a red light signal and whether the target traffic light is within a threshold of an end of the red light signal and to determine whether the driver's degree of attentiveness is high enough for driving, the target traffic light being a next traffic light in a travelling direction of the vehicle after passing through a current traffic light;

generating a warning command if it is determined the target traffic light is in the red light signal and within the threshold of the end of a red light signal and the driver's degree of attentiveness is not high enough for driving; and outputting the warning command to a human machine interface (HMI) of the vehicle to trigger a vehicle-launching warning in the vehicle.

15. A non-transitory computer readable medium comprising vehicle-launching warning instructions stored in a memory and executed by a processor to carry out the steps, comprising:

acquiring traffic light information and driver status information and acquiring some or all of the following: information on location, status and navigation of a vehicle, map information, status information of a preceding vehicle, and environmental information;

processing the acquired information to determine that a target traffic light is in a red light signal and whether the target traffic light is within a threshold of an end of the red light signal and to determine whether the driver's degree of attentiveness is high enough for driving, the target traffic light being a next traffic light in a travelling direction of the vehicle after passing through a current traffic light;

generating a warning command if it is determined the target traffic light is in the red light signal and within the threshold of the end of a red light signal and the driver's degree of attentiveness is not high enough for driving; and outputting the warning command to a human machine interface (HMI) of the vehicle to trigger a vehicle-launching warning in the vehicle.

* * * * *